United States Patent
Jalluri et al.

(10) Patent No.: US 8,380,462 B2
(45) Date of Patent: Feb. 19, 2013

(54) SYSTEM AND METHOD FOR SETTING MACHINE LIMITS

(75) Inventors: Chandra Sekhar Jalluri, Canton, MI (US); Himanshu Rajoria, Canton, MI (US); John Christopher Pauli, Trenton, MI (US); David P. Low, Amherstburg, CA (US)

(73) Assignee: Ford Motor Company, Dearborn, MI (US)

( * ) Notice: Subject to any disclaimer, the term of this patent is extended or adjusted under 35 U.S.C. 154(b) by 265 days.

(21) Appl. No.: 12/883,270

(22) Filed: Sep. 16, 2010

(65) Prior Publication Data

US 2012/0068658 A1    Mar. 22, 2012

(51) Int. Cl.
*G06F 11/32* (2006.01)

(52) U.S. Cl. ......................................... 702/179; 700/159

(58) Field of Classification Search .................. 318/566, 318/626, 635; 700/159, 174; 702/179
See application file for complete search history.

(56) References Cited

U.S. PATENT DOCUMENTS

| | | | |
|---|---|---|---|
| 6,845,340 B2 | 1/2005 | Edie et al. | |
| 7,383,097 B2 | 6/2008 | Jalluri et al. | |
| 7,409,261 B2 | 8/2008 | Jalluri et al. | |
| 7,571,022 B2 | 8/2009 | Jalluri et al. | |
| 2006/0089744 A1* | 4/2006 | Jalluri et al. | 700/174 |
| 2007/0088454 A1 | 4/2007 | Jalluri et al. | |
| 2007/0198219 A1* | 8/2007 | Havela et al. | 702/187 |
| 2007/0256428 A1* | 11/2007 | Unger et al. | 62/6 |
| 2010/0293493 A1* | 11/2010 | Khazanov et al. | 715/771 |

* cited by examiner

*Primary Examiner* — Mark Budd
(74) *Attorney, Agent, or Firm* — Damian Porcari; Brooks Kushman P.C.

(57) ABSTRACT

A system and method for setting machine limits include setting a limit for a machine parameter, setting a temporal operating range for the machine, and setting a temporal step. The machine is operated over the operating range and the machine parameter is measured. A first new limit for the machine parameter is set based at least in part on the measurements over the operating range. The operating range is advanced by the temporal step, and the machine parameter continues to be measured. Another new limit for the machine parameter is set based at least in part on the measurements over the operating range after the operating range has been advanced.

20 Claims, 5 Drawing Sheets

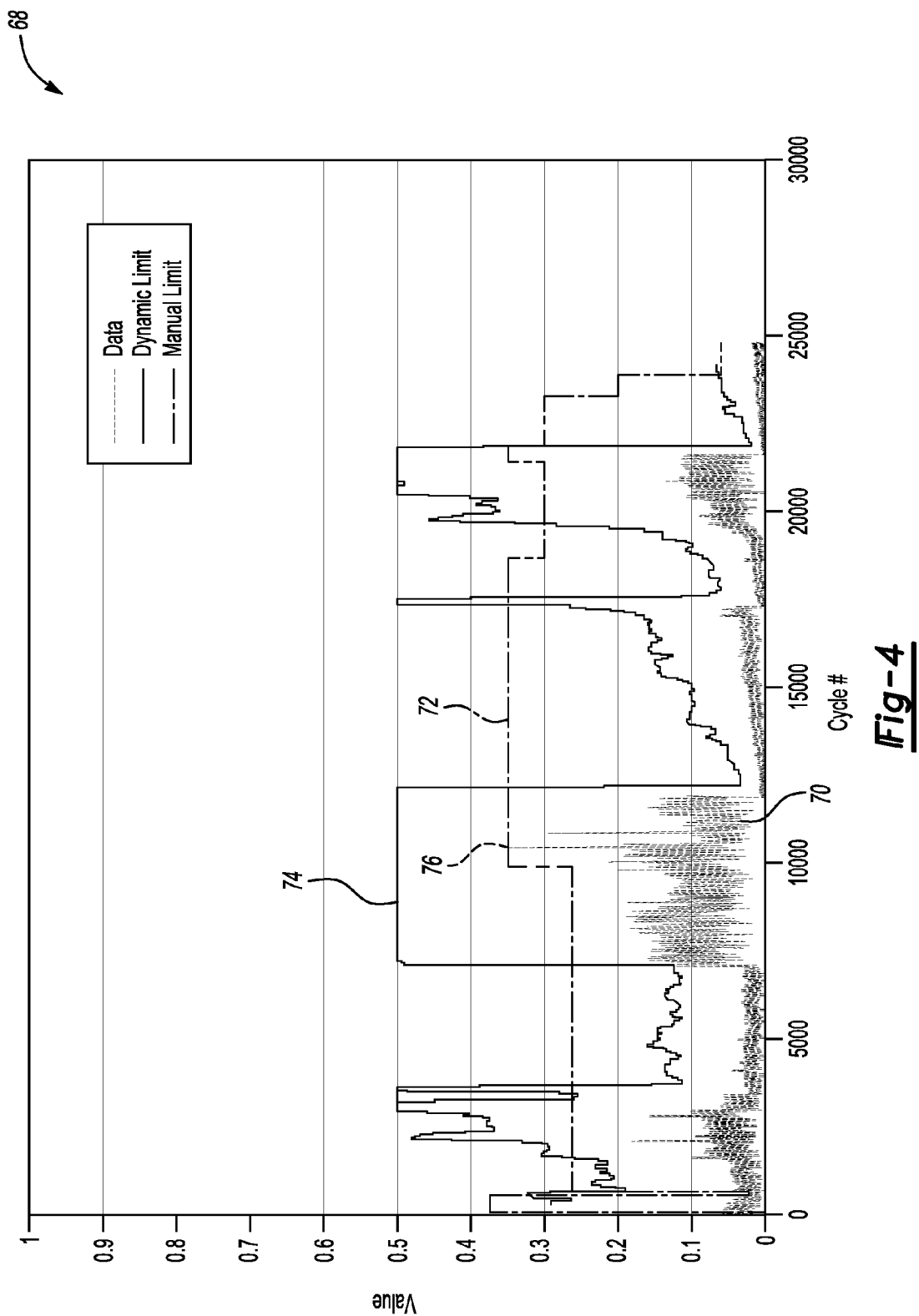

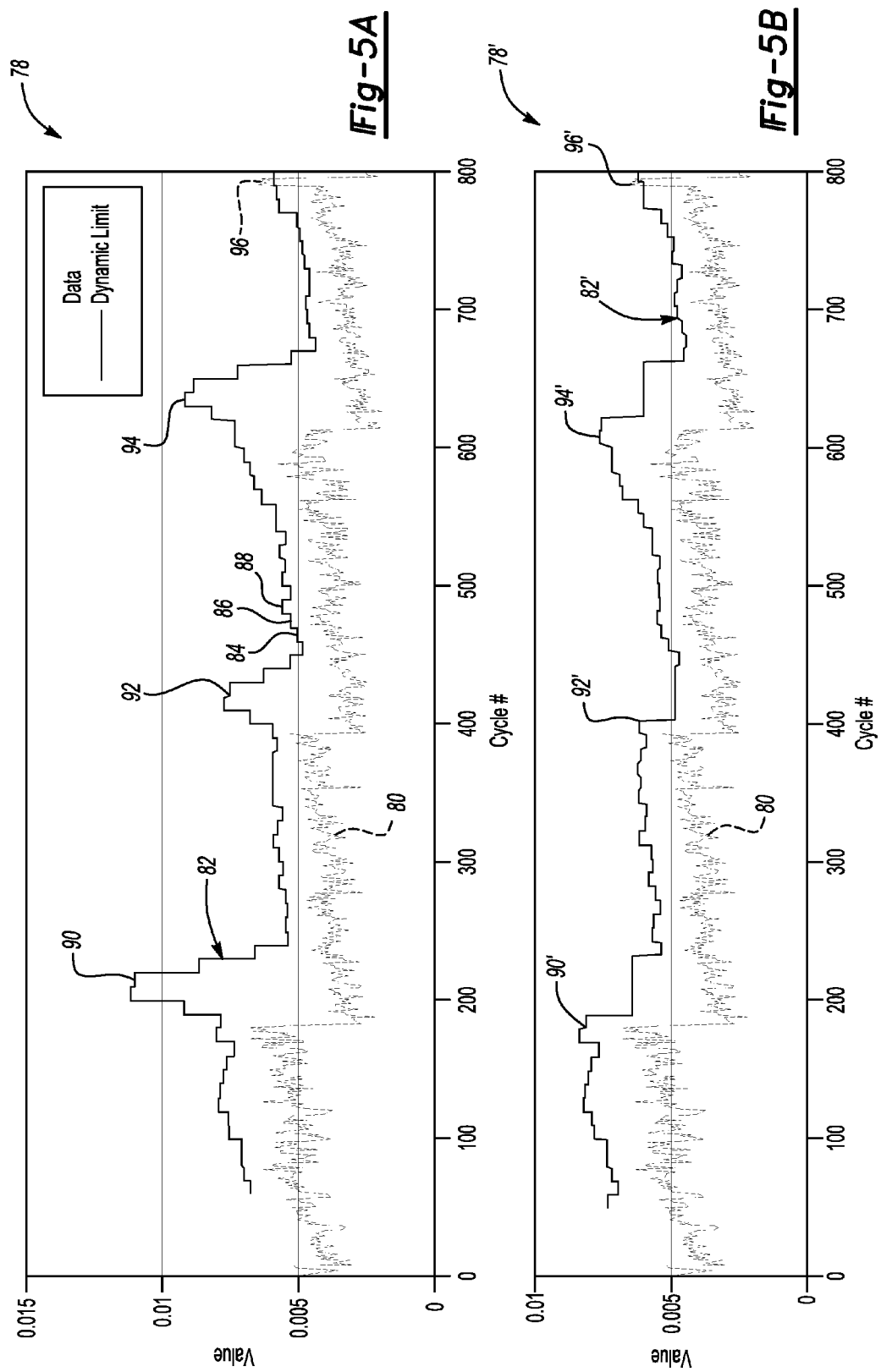

SYSTEM AND METHOD FOR SETTING MACHINE LIMITS

TECHNICAL FIELD

The present invention relates to a system and method for setting machine limits.

BACKGROUND

In order to increase the quality of manufactured parts, reduce downtime and improve efficiency, manufacturers analyze machine tools and their associated components in an effort to gather information they can use to make decisions regarding production systems and processes. One type of machine tool analysis used is a vibration analysis. Information gathered from this type of analysis may be indicative of a variety of different production problems.

When a vibration analysis is used, an acceptable vibration limit may be determined and used as an indicator such that when a measured vibration exceeds the limit, an alarm or some other action is triggered. Examples of such systems are described in the following United States patents: U.S. Pat. Nos. 6,845,340, 7,383,097, 7,409,261, and 7,571,022.

Machine analysis systems and methods may employ a limit or limits that indicate acceptable data measurements. Different limits can be used for different processes, and within a single process, an operator may perform a manual adjustment of the limit or limits. Because processes may change over time, the data gathered from a single process may also change. It would therefore be advantageous to have a system and method for automatically adjusting data limits based on changes in the process or other inputs.

SUMMARY

Embodiments of the invention include a system and method for setting machine limits. The machine limits may be determined automatically, and may be dynamic, in that they can change over time as the machine processes change.

In some embodiments, a method for setting machine limits includes setting a limit for a machine parameter. The machine parameter may be, for example, vibration data measured at one or more points on a machine tool that is operable to perform work on a workpiece. The data may be raw vibration data, or it may be some parametric representation of raw data, such as a root mean square (RMS) value or a kurtosis. The limit that is set would represent a maximum amplitude for which it would be undesirable for the measured data to exceed. If the measured data did exceed the set limit, any number of actions could be taken, for example, a visual or audible alarm may sound to warn the operator, the machine could be shut down, or other action could be automatically taken.

In addition to setting a limit for the machine parameter, the method described above includes the steps of setting a temporal operating range for the machine. A "temporal operating range" implies an operating range for the machine that is based on or otherwise related to time. For example, the operating range may be a number of machining cycles if the machine is a machine tool configured for cutting a workpiece. The number of cycles performed by a machine tool is directly related to time. Similarly, the operating range may be based directly on time, such that the range is set at a certain number of minutes, hours, days, etc. In addition to setting the temporal operating range, a temporal step is also set. The temporal step, as explained in detail below, represents an amount of incremental movement for the operating range. For example, if the operating range is set at 300 cycles, a temporal step may be set at 50 cycles, and upon the occurrence of certain events, the operating range may be moved forward in time by the amount of the temporal step—i.e., 50 cycles.

Once the limit, temporal operating range, and the temporal step are all set, the machine is operated over the operating range. The machine parameter is measured over the operating range, and a first new limit for the machine parameter is automatically set based at least in part on the measurements over the operating range. For example, if the operating range is 300 cycles and the machine parameter is vibrations, the vibrations of the machine will be measured for the 300 cycles of operation. This data will then be used to calculate a first new limit that will replace the initial limit set at the outset of the operation. In this way, the limit is automatically adjusted based on the actual machine operation.

After the first new limit is set, the entire operating range will be advanced by the temporal step. Continuing with the example from above, after the first 300 cycles of operation are recorded, the range will be advanced by 50 cycles so that it now includes cycle numbers 51-350. The machine parameter is measured over the advanced operating range, and a further new limit is set for the machine parameter based at least in part on the measurements over the advanced operating range. This process is continued in a stepwise fashion with a new limit being set automatically each time the additional 50 cycles are measured after the operating range is advanced.

Embodiments of the invention also include the step of removing outlying data from the machine parameter measurements prior to setting a new limit for the machine parameter. In this way, the limit more accurately reflects the actual operating of the machine, without considering anomalous results that could otherwise skew the limits. In some embodiments, the temporal operating range is initially set to be equal to the temporal step. Again using the numbers from the example above, the initial operating range is set to be equal to 50 cycles, which is the same as the temporal step. Once the machine is operated for 50 cycles, the first new limit for the machine parameter is calculated and set based on these initial measurements. At this point, the operating range is not advanced; rather, it is expanded. That is, the operating range may now be expanded to twice the temporal step, such that it is 100 cycles.

Once the additional 50 cycles are measured, a second new limit is set for the machine parameter. This increasing of the temporal operating range continues until it reaches a desired operating range, which, using the example from above, is 300 cycles. In this way, six new limits will be set for the machine parameter prior to the operating range being advanced by the temporal step for the first time. Embodiments of the invention employing this method may have a quicker response to the initial operation of the machine, as opposed to waiting for a full 300 cycles to set a new limit. In the example above, the operating range was increased by an amount equal to the temporal step; however, it could be advanced by some other predetermined amount until the operating range was increased to the desired amount.

Embodiments of the invention also include a system for setting machine limits for a machine having at least one sensor associated with it. The sensor is configured to measure a machine parameter and to output signals related to the machine parameter. The system includes a control system having at least one controller. The control system is programmed with a limit for the machine parameter, a temporal operating range, and a temporal step. The control system is configured to receive signals from the at least one sensor while the machine is operating over the operating range. It is also configured to set a first new limit for the machine parameter based at least in part on the signals received from the at least one sensor. In addition, the control system advances the operating range by the temporal step, receives signals from the at least one sensor while the machine is operating over the advanced operating range, and sets a further new limit for the machine parameter based at least in part on the signals received from the at least one sensor while the machine is operating over the advanced operating range.

BRIEF DESCRIPTION OF THE DRAWINGS

FIG. 4 is a data plot illustrating another example of the variation in a measured machine parameter and machine parameter limits that are set manually and in accordance with an embodiment of the present invention;

FIG. 5A is a data plot illustrating the measurements of a machine parameter and limits set in accordance with an embodiment of the present invention in which no adjustment was made for cutting tool changes; and FIG. 5B is the data plot from FIG. 5A with the limits set in accordance with another embodiment of the present invention, wherein adjustment is made for cutting tool changes throughout operation of the machine.

DETAILED DESCRIPTION

Figure 1:
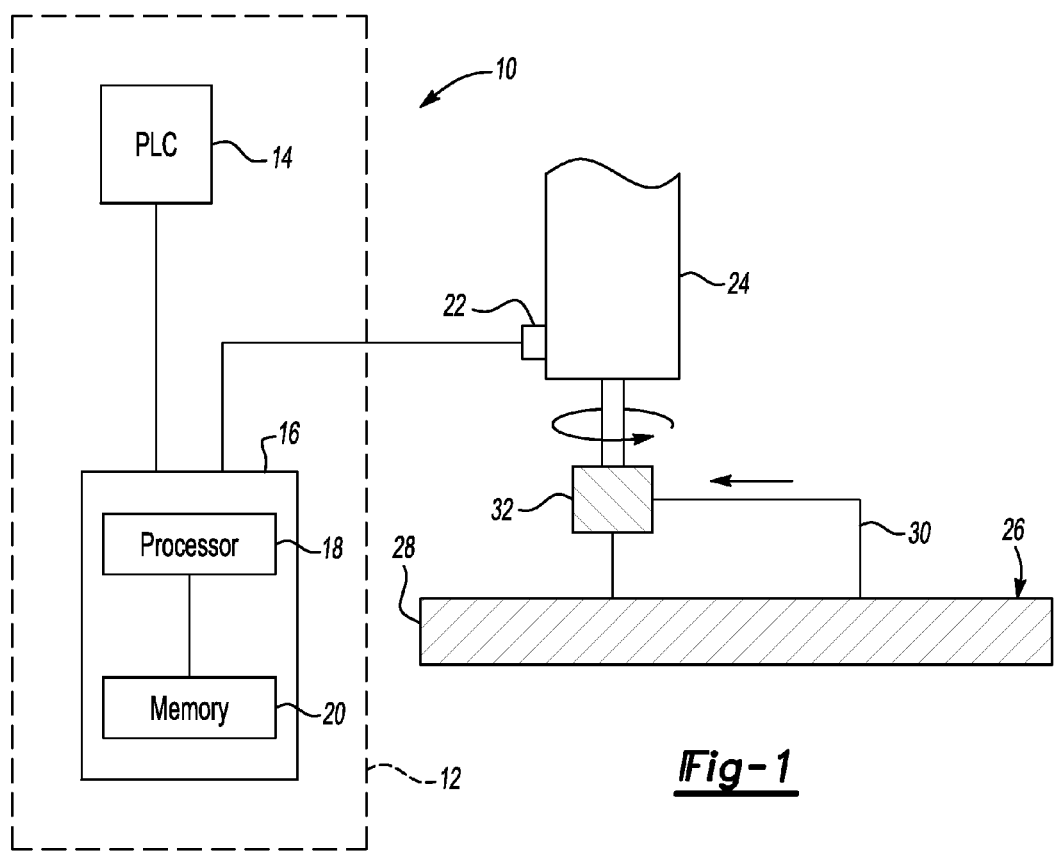
FIG. 1 is a schematic representation of a system in accordance with an embodiment of the present invention.

FIG. 1 shows a system 10 in accordance with an embodiment of the present invention. The system 10 includes a control system shown generally at 12 that includes a programmable logic controller (PLC) 14 and a processing unit 16. The processing unit 16 includes a processor 18 and a memory 20. The processor 18 may be programmed to perform specific instruction sets on data, such as vibration data received from a sensor 22. The sensor 22 is attached to a spindle 24 that is part of a machine tool 26. The machine tool 26 also includes a movable bed 28 that is operable to move a workpiece 30 into a cutting tool 32 attached to the end of the spindle 24.

The PLC 14 may be programmed with information regarding particular machining operations. It is configured to output signals related to the machining processes to the processing unit 12. For example, if a set of machining operations are being performed on the workpiece 30, and completion of this set of operations constitutes a machining cycle, the PLC 14 can, among other things, output signals to the processing unit 12 delineating different portions of the machining cycle.

The vibration sensor 22 may be chosen from any one of a number of types of vibration sensors, such as an accelerometer, a velocity sensor, or any other suitable sensor capable of sensing vibrations. Of course, other types of sensors may be used—i.e., ones that sense machine parameters other than vibrations. For example, a current sensor may be used to measure changes in the amount of current the machine tool 26 draws during various machining operations. Similarly, a thermocouple or other type of temperature sensor could be used to detect changes in temperature of some portion of the machine tool 26. The spindle speed or torque could also be sensed to provide information relating to the machining operations.

The processing unit 16 may be programmed with various information so that the system 10 performs in accordance with an embodiment of the present invention. For example, for the system 10 and the associated machine tool 16, the machine parameter under examination is vibrations, as measure by the vibration sensor 22. Thus, the processing unit 16 can be programmed with a vibration limit that can be used to indicate a condition that requires operator attention. The processing unit 16 can also be programmed with a temporal operating range, such as a number of cycles, and a temporal step, which can also be measured in cycles. The processing unit 16 receives signals from the sensor 22 while the machine tool 26 is operating over the operating range. Although the operating range described in the example above was 300 cycles, it is understood that other numbers can be used. For example, it may be convenient to define the operating range by a number of cycles (N) that is approximately equal to one day's worth of production data.

After the processing unit 16 receives signals from the sensor 22 while the machine tool 26 is operating over the operating range, the processing unit 16 can calculate and set a first new vibration limit based at least in part on the signals received from the sensor 22. One way to set the limit is to start with a mean value of the data collected over the operating range and add or subtract some factor of the standard deviation of the data collected. As described in detail below, outliers or outlying data points, may be removed from the data set prior to this calculation being made to decrease the unwanted effects of anomalous events.

After the first new vibration limit is set, the processing unit 16 automatically advances the operating range by a predetermined amount, which may be equal to the temporal step. It continues to receive signals from the sensor 22 while the machine tool 26 is operating over the advanced operating range, and once the data is collected over the advanced operating range, the processing unit 16 sets another new limit for the vibrations, for example, using the mean and standard deviation calculation described above.

Figure 2:
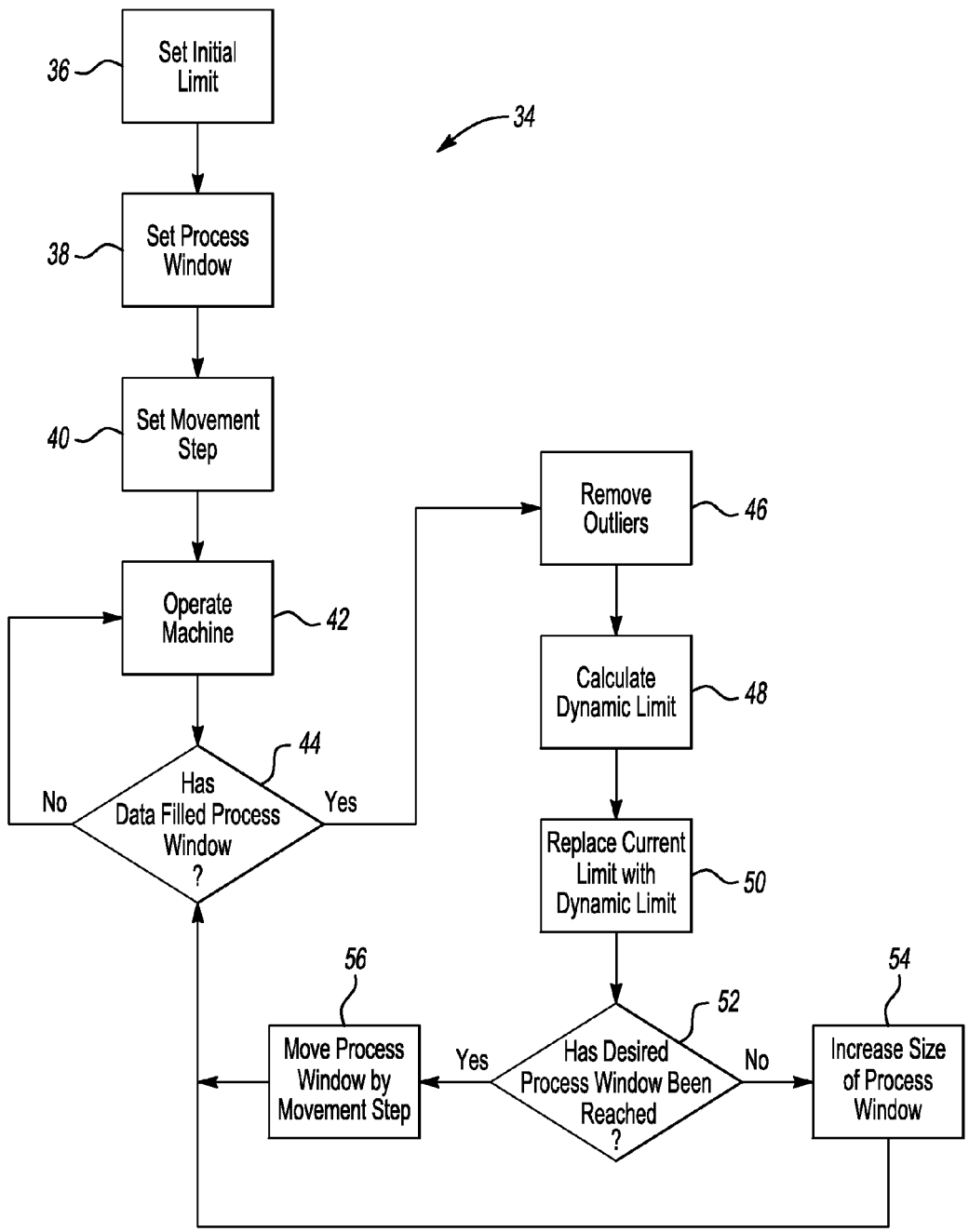
FIG. 2 is a flowchart illustrating an embodiment of a method in accordance with the present invention.

FIG. 2 shows a flowchart 34 detailing a method in accordance with an embodiment of the present invention. It is understood that the method described in the flowchart 34 shown in FIG. 2 may be performed, for example, by a control system, such as the control system 12 shown in FIG. 1. For convenience, the system 10 and other elements shown in FIG. 1 may be used for reference while describing the steps of the flowchart 34; however, it is understood that the method shown in FIG. 2 may be performed by other systems operating in conjunction with other types of machines. Turning to FIG. 2, the flowchart 34 starts at step 36 where an initial limit for a machine parameter is set. As described above, this may be, for example, a vibration limit for a machine tool, such as the machine tool 26. The initial limit can be set based on, for example, a historical knowledge of the machine or system being used. In some embodiments, a maximum value for the machine parameter may be chosen as the initial limit. The temporal operating range, or "process window", for the machine is set at step 38. At step 40, the temporal step or "movement step" is also set. As described above, each of the values set in steps 36, 38, 40 can be programmed into a control system, such as the control system 12 shown in FIG. 1.

At step 42, the machine is operated, and at decision block 44 it is determined whether the process window is filled with data. Stated another way, the decision block 44 determines whether the machine has been operated over the entire operating range previously set at step 38. If the answer is no, the method loops back to step 42 until data has filled the entire process window. Once this occurs, the outlying data points are removed from the collected data at step 46. One way to remove such outlyers is to calculate the mean of the data collected and add and/or subtract some factor of the standard deviation. In some embodiments, with some machine tools, using a factor of 1.8 times the standard deviation has been shown to be effective. Thus, the highest and lowest data points from the collected data set are removed.

At step 48, a dynamic limit is set using the remaining data points. The "dynamic limit" is referred to above as a first new limit for the particular machine parameter in question. As described above, this limit may be set by taking the mean of the data and adding and/or subtracting some factor of the standard deviation, which will now be a smaller standard deviation than was calculated at step 46, since the outlying data points were removed. Once the new limit is calculated at step 48, it replaces the initial limit previously set at step 3—see step 50.

When the process window is set at step 38, it may be immediately set to a desired range, such as 300 cycles. When the process window is set to its desired size at step 38, it will be advanced by an amount equal to the movement step after the current limit is replaced with the dynamic limit at step 50. Alternatively, the process window can be set to a smaller range, for example, it may be set to be equal to the movement step that is set in step 40. When the process window is initially set to a size less than the desired size, it can be expanded incrementally until it reaches the desired size. For example, after the current limit is replaced with the dynamic limit at step 50, it is determined at decision block 52 whether the desired process window has been reached. If, for example, the desired process window is 300 cycles, and the process window is initially set at step 38 to be equal to the movement step of 50 cycles, the answer at decision block 52 will be "no" for the first iteration of the method. In this case, the size of the process window will be increased at step 54, for example, by some predetermined amount that could be equal to the movement step, or 50 cycles.

After step 54, the method will loop back to step 44 and while the machine continues to operate and data continues to be collected the decision will again be made at decision block 44 as to whether the now increased process window has been filled with data. This sub-loop of steps 44-54 will continue until the answer at decision block 52 is "yes", indicating that the desired process window size has been reached. Once the desired process window size has been reached, the entire process window is moved at step 56 by an amount equal to the movement step. When this occurs some but not all, of the process window will be filled with data and additional machining cycles will need to be performed to again fill the process window and move from step 44 to step 46.

Figure 3:
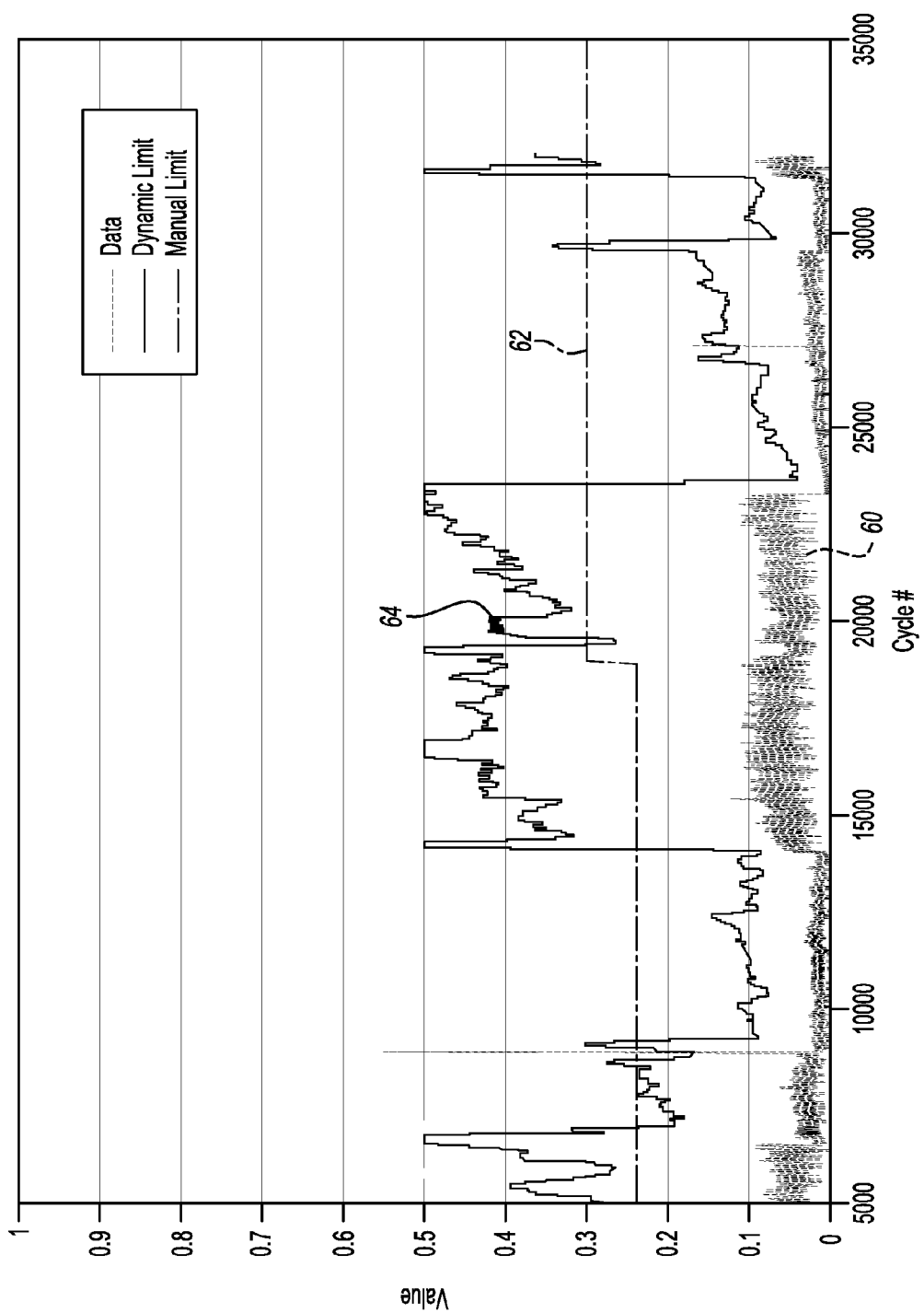
FIG. 3 is a data plot illustrating the changes in value for a measure machine parameter over time juxtaposed against machine parameter limits that are set manually and machine parameter limits that are set in accordance with embodiments of the present invention.

FIG. 3 is a data plot 58 showing vibration data 60 measured over a number of machining cycles. Also shown is a limit 62 manually set by a machine operator, and a dynamic limit 64 set in accordance with an embodiment of the present invention. As shown in FIG. 3, the manual limit 62 is a step function that may be determined, for example, based on an operator's interpretation of the vibration data 60. For purposes of the data plot 58, the amplitude of the vibration data is shown as a statistical value, for example, kurtosis. In contrast to the manually set limit 62, the dynamic limit 64 changes frequently, responding directly to changes in the vibration data 60.

As discussed above, the dynamic limit 64, in addition to the statistical calculation described above, is subject to a maximum value function, such that for the example shown in FIG. 3, it never exceeds an amplitude value of 0.5 By automatically changing in response to changes in the measured data 60, the dynamic limit 64 is able to detect a spike in the vibrations at approximately 27,000 cycles, as indicated at point 66. At point 66, the vibration data 60 exceeds the local value of the dynamic limit 64, but is still well under the manual limit 62 that was set by the machine operator. In general, manual limits will be adjusted less frequently because of the burden placed on machine operators. Therefore, the manual limit 62, which was raised just before 20,000 cycles based on an increase in the amplitude of the vibration data 60, had not yet returned to a lower level by the time the vibration spiked at point 66. Conversely, the dynamic limit set in accordance with an embodiment of the present invention, automatically adjusted based on the changes in the vibration data 60.

FIG. 4 shows a data plot 68 that again includes vibration data 70, a manually set limit 72 and a dynamic limit 74 set in accordance with an embodiment of the present invention. Again, the dynamic limit 74 is limited to a maximum value of 0.5 such that any calculated limit above that level is clipped. The data plot 68 shows almost the reverse condition from the data plot 58. That is, at about 10,000 cycles, the vibration data 70 spikes to a point 76 that is almost equal to the level of the manual limit 72. Although the amplitude of the vibration data 70 at point 76 is relatively high, the entire vibration trace from approximately 7,000 cycles to approximately 12,000 cycles is higher than at other locations along the time line. Therefore, the vibration spike at point 76 does not necessarily indicate a condition that would be cause for operator intervention; yet, it may have gone past the manual limit 72, which had not been adjusted to accommodate the general increase in the vibration amplitude over this range of cycles. Had the vibration amplitude at point 76 exceeded the manual limit, it would have resulted in a false alarm, in that the deviation at point 76 from the rest of the vibration measurements in the selected cycle range was not that great. Thus, the dynamic limit 74 over the range of cycles is increased to a much higher value of approximately 0.5, indicating that the vibration spike at point 76 was never in danger of exceeding the dynamic limit 74 and setting off a false alarm.

In addition to relying on the automatic updating and setting of new limits for a machine, embodiments of the present invention can also utilize some input from a machine operator. For example, FIG. 5A shows a data plot 78 having vibration data 80 and a dynamic limit 82 set in accordance with an embodiment of the present invention. The trace of the dynamic limit 82 shows a number of small, incremental steps, such as the steps 84, 86, 88. These steps are noted here because they represent the length of the movement step, or the temporal step, as described above. Also shown in the data plot 78 are three peaks of the dynamic limit 82 shown at points 90, 92, 94. The points 90, 92, and 94 are noteworthy because they show an increase in the dynamic limit 82 at a time when the vibration measurements 80 are relatively low, and in fact, have decreased. The decrease in the vibration measurements 80 at approximately 200, 400, and 600 cycles, results from a machine operator changing a cutting tool so that a new tool, subject to less vibration, is introduced at each of these points along the timeline.

The dynamic limit 82 does not automatically determine the tool change, and therefore, the peaks in the dynamic limit at points 90, 92, 94 result from increasing values of the vibration measurement 80 just prior to the tool changes. To account for events, such as tool changes, embodiments of the present invention can adjust the dynamic limit manually upon the occurrence of such events. FIG. 5B illustrates one such data plot 78' wherein the dynamic limit 82' has been so adjusted. In particular, the same vibration data 80 is shown in FIG. 5B; however, the dynamic limit 82' has been manually adjusted at points 90', 92', 94', to reduce the values based on the three tool changes.

One way to make this adjustment is to have the dynamic limit calculation restarted each time the cutting tool is changed. For example, using the flowchart 34 illustrated in FIG. 2, the process could be reset to step 36 at each tool change, regardless of where in the flowchart 34 the process was when the tool change occurred. Alternatively, the amplitude of the dynamic limit 82 can be reduced by some predetermined amount at each tool change, so that the dynamic limit 82' more closely resembles the contour of the data measurements 80. This type of manual adjustment can also be performed when a false alarm occurs, but in such a case, the dynamic limit will be increased at the point of the false alarm, rather than decreased as in the case of a tool change. It is worth noting that even with the peaks 90, 92, 94 in the dynamic limit 82 shown in FIG. 5A, the dynamic limit 82 still closely tracked the vibration data 80, and was able to detect the occurrence of a tool breakage 96 shown at approximately 790 cycles where the vibration data 80 exceeds the limit 82.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for setting machine limits, comprising:
   setting a limit for a machine parameter;
   setting a temporal operating range for the machine;
   setting a temporal step;
   operating the machine over the operating range;
   measuring the machine parameter over the operating range;
   setting a first new limit for the machine parameter based at least in part on the measurements over the operating range;
   advancing the operating range by the temporal step;
   measuring the machine parameter over the advanced operating range; and
   setting a further new limit for the machine parameter based at least in part on the measurements over the advanced operating range.

2. The method of claim 1, wherein the temporal range and temporal step are both measured in machining cycles.

3. The method of claim 1, further comprising removing outlying data from the machine parameter measurements prior to the step of setting a first new limit for the machine parameter.

4. The method of claim 1, wherein the temporal step is not greater than the temporal operating range.

5. The method of claim 4, wherein the temporal operating range is initially set equal to the temporal step, the first new limit being based at least in part on the measurements over the operating range when the operating range is equal to the temporal step, the method further comprising the steps of:
   (a) increasing the operating range by a predetermined amount prior to advancing the operating range by the temporal step;
   (b) measuring the machine parameter over the increased operating range; and
   (c) setting a second new limit for the machine parameter based at least in part on the measurements over the increased operating range.

6. The method of claim 5, further comprising:
   determining a desired operating range; and
   repeating steps (a)-(c) until the increased operating range equals the desired operating range, the step of advancing the operating range by the temporal step being performed when the increased operating range equals the desired operating range.

7. The method of claim 5, wherein the predetermined amount is equal to the temporal step.

8. The method of claim 1, wherein the step of setting the first new limit for the machine parameter includes not letting the first new limit exceed a predetermined maximum value.

9. The method of claim 8, wherein the step of setting a limit for the machine parameter includes setting the limit equal to the predetermined maximum value.

10. The method of claim 1, wherein the machine is a machine tool operable to perform machining operations on a workpiece using a cutting tool, the method further comprising:
    manually adjusting the limit for the machine parameter after the occurrence of a predetermined event.

11. The method of claim 10, wherein the predetermined event is one of a changing of the cutting tool or a false alarm.

12. The method of claim 10, wherein the step of manually adjusting the limit for the machine parameter includes reducing the limit for the machine parameter by a predetermined amount.

13. A method for setting machine limits, comprising:
    setting a temporal range for the machine;
    measuring a parameter over the range;
    setting a limit for the parameter based at least in part on the measurements over the range;
    moving the range forward;
    measuring the parameter over the moved range; and
    setting a new limit for the parameter based at least in part on the measurements over the moved range.

14. The method of claim 13, wherein the temporal range is a number of machining cycles and the parameter is a vibration measurement for the machine.

15. The method of claim 14, wherein the step of moving the range forward includes moving the range forward by a predetermined number of cycles.

16. A system for setting machine limits for a machine having at least one sensor associated therewith for measuring a machine parameter and outputting signals related thereto, the system comprising:
    a control system including at least one controller, the control system being programmed with a limit for the machine parameter, a temporal operating range, and a temporal step, and being configured to:
    receive signals from the at least one sensor while the machine is operating over the operating range,
    set a first new limit for the machine parameter based at least in part on the signals received from the at least one sensor,
    advance the operating range by the temporal step,
    receive signals from the at least one sensor while the machine is operating over the advanced operating range, and
    set a further new limit for the machine parameter based at least in part on the signals received from the at least one sensor while the machine is operating over the advanced operating range.

17. The system of claim 16, wherein the control system is further configured to remove outlying data from the signals it receives from the at least one sensor prior to setting the first new limit for the machine parameter.

18. The system of claim 16, wherein the temporal operating range programmed into the control system is an initial temporal operating range equaling the temporal step, the first new limit being based at least in part on the signals received from the at least one sensor while the machine is operating over the initial temporal operating range.

19. The system of claim 18, wherein the control system is further configured to:
(a) increase the operating range by a predetermined amount prior to advancing the operating range by the temporal step,
(b) receive signals from the at least one sensor while the machine is operating over the increased operating range, and
(c) set a second new limit for the machine parameter based at least in part on the signals received from the at least one sensor while the machine is operating over the increased operating range.

20. The system of claim 19, wherein the control system is further programmed with a desired operating range, and is further configured to repeat steps (a)-(c) until the increased operating range equals the desired operating range, the control system performing the step of advancing the operating range by the temporal step when the increased operating range equals the desired operating range.

\* \* \* \* \*